Aug. 14, 1934.                E. H. NICHOLS                1,970,471
                            GRANULAR MATERIAL
                           Filed Sept. 13, 1932
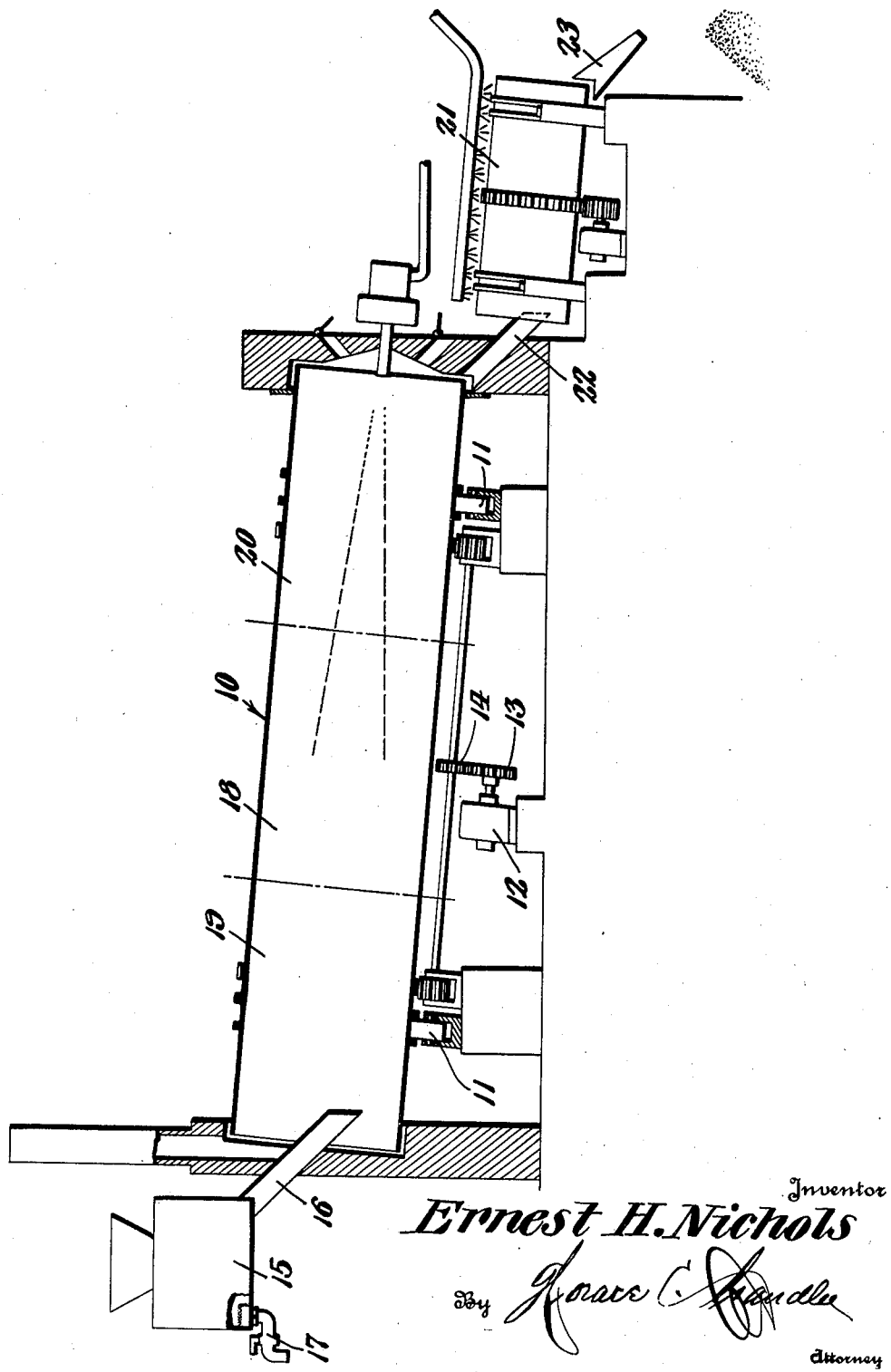
Inventor
Ernest H. Nichols
By
       Attorney Patented Aug. 14, 1934

1,970,471

UNITED STATES PATENT OFFICE 1,970,471

GRANULAR MATERIAL

Ernest H. Nichols, Hagerstown, Md.

Application September 13, 1932, Serial No. 633,011

9 Claims. (Cl. 91—70)

This invention relates to new and useful improvements in "granular material" such as is principally used as a surfacing for asphalt shingles and other forms of asphalt roofing, and a process for producing the same.

It is necessary for this granular material, which has come to be known as "roofing granules" to be weather resisting, for durability, and necessary for the granules to have a rough and uneven surface in order that they may adhere firmly to the asphalt of the roofing in connection with which they are used. Again, because of the fact that they are largely used for ornamentation, they must not only be of various colors, to harmonize with the color scheme of the building on which they are used, but these colors must be bright, even, and lasting.

In the past, these granules have been made from crushed brick, slate, stone, and other materials which have been left in their natural colors or else artificially colored, with various pigments, but the result has not been satisfactory because the colors had a tendency to fade, have been dull, and usually unevenly distributed throughout a run or batch of granules. Roofing granules have also been made with a fused or glassy surface, produced in various ways to increase their brilliancy, but the result has been that this fusing has produced a granule having such a smooth and uninterrupted surface as to render it impossible for the asphalt of the roofing to properly take hold thereof. Such granules became detached in large quantities, producing a spotty and unsightly appearance.

It, therefore, is an object of this invention to provide roofing granules which shall possess a proper degree of durability, which shall be evenly, permanently, and brilliantly colored, and which shall have a rough surface, also an object to provide a method of producing granules having these characteristics in a wide range of colors.

I have found that shale lends itself to the production of granules of the present type in a very satisfactory manner, as it is sufficiently porous, can be easily crushed to the proper size, and conveniently fired. Other materials, such as stone, slate, crushed brick, etc., may also be used, however, if sufficiently porous.

I take the ordinary raw shale, as it comes from the ground (such as that found in Watsontown Valley, Pennsylvania), and run it through a suitable crusher. It is then screened to obtain particles of the proper size, such particles to be hereinafter referred to as "granule stock".

After the granule stock has been produced, this being of a size that will pass a No. 8 mesh screen and be retained on a No. 35 mesh screen, it is placed in a suitable batch mixer containing a mixture of water, a porcelain enamel frit, a color producing metallic salt or color compound, according to the color desired, such as is commonly used for coloring porcelain, and a water soluble priming flux, such as borax, these having been previously thoroughly ground and mixed together in a pebble mill, the amount of water used being such as to produce a proper degree of fluidity. When charging the mixer, the proportions are preferably five gallons of the mixture just described to one ton of granules.

It will also be understood that, when preparing this mixture in the pebble mill, equal parts of frit and borax will be used, the amounts of coloring matter used being governed by the result desired.

The mixer is then operated to cause the granule stock to become saturated, due to its porosity, with a quantity of the water, which carries with it dissolved flux and coloring, but not the insoluble frit, this being left on the surface of the granules excepting for a small quantity which may, perhaps, enter such pores as are sufficiently large to receive it. The stock is thus impregnated with flux and coloring and has a surface coating of the entire mixture, including the frit.

The excess mixture is then drawn from the mixer after which the stock passes into a rotary kiln in which there are three zones of heat, the first, which begins at the entrance and extends substantially one-third the length of the kiln having a temperature of approximately 1100° F. Here the flux becomes fused, together with the silicates contained in the shale, with which the flux has come into contact, so that each granule contains a quantity of this fused material, which fills its pores, and has a coating thereof on its surface, this surface coating then serving to bind the exterior layer of the then unfused enamel frit and coloring and to hold the same to the stock until the latter reaches the second heat zone. This zone occupies the central longitudinal third of the kiln and the temperature therein is approximately 1500° F., this being a temperature which is only sufficiently high to partly fuse the frit as it passes through the kiln, the usual temperature employed for fusing this frit completely, in the production of porcelain, being approximately 2000° F. The flux, as will be understood, will cause the frit to begin to fuse at a lower temperature than otherwise.

Owing to the fact that the granule stock will not, at any time, be subjected to a temperature sufficiently high to completely melt the frit within the time that said stock is passing through the kiln, the fine particles of which it is composed will not entirely combine with the thoroughly melted borax, to form a homogeneous mass, but will tend to remain intact, so that the completed granules will have a rough surface, somewhat resembling sand paper, though possessing the usual ceramic appearance. While in this condition, the granule stock passes to the third and last heat zone where the temperature is approximately 1200° F. Here the temperature of the granules is lowered somewhat before they pass from the kiln into a rotary cooler, so as to prevent cracking of their surface glaze. From the cooler, which is preferably of the roller type, and provided with a cooling spray of water, the granules pass into a suitable place of storage.

It will be understood that the temperatures used in the kiln are to be governed by the nature of the flux and frit employed, some requiring a higher temperature than given, while others may require a lower temperature. It will be understood, however, that the temperature of the first zone will be such as will cause a complete fusing of the flux, and that the temperature of the second zone will be such as will cause only a partial fusing of the frit, the temperature of the third zone being somewhat less than that of the second, to prevent a too sudden cooling of the granules. The temperatures given, however, should be proper for use with borax as a flux and with a frit prepared from the following formula: silica, 66.00 parts; alumina, 7.00 parts; zinc oxide, 4.00 parts; calcium oxide, 4.50 parts; magnesium oxide, .32 parts; potassium oxide, 2.00 parts; sodium oxide, 11.00 parts; boric oxide, 5.00 parts; manganese dioxide, .10 parts; and iron oxide, .08 parts.

In the drawing, which illustrates a type of kiln that may be used to produce granules in accordance with the present method, 10 represents an inclined rotary kiln supported on rollers 11 and driven by a motor 12, through the medium of gears 13 and 14. The mixer is indicated at 15 and is connected to the kiln by a chute 16, for conveying the granule stock thereto, after the excess mixture has been drawn from the mixer through the discharge spout 17. When forming the granules from material having exceedingly small pores, it may be necessary to apply pressure to the mixer, in order to cause penetration of the mixture.

The kiln is heated by means of a suitable burner 17a which is arranged to throw a flame longitudinally thereof in such a manner as to heat the central longitudinal third thereof, indicated at 18, to the greatest degree, while the third, numbered 19, which lies nearest the entrance end, is heated to a lesser degree, and the remaining third, numbered 20, adjacent the burner, is heated to an intermediate temperature. For example, the burner must be capable of maintaining the temperature of the first mentioned third or zone at 1500° F., that of the second mentioned zone at 1100° F., and that of the third zone at 1200° F. Adjacent the discharge end of the kiln is a rotary cooler 21, which receives the granules therefrom through a chute 22, and is provided with a discharge chute 23, from which the granules may pass to storage.

Because of the rotary movement of the kiln, the particles comprising the granule stock will be constantly agitated, which will prevent the particles from sticking together and also cause them to be evenly exposed to the heat, on all sides, insuring an even treatment with respect to the hardening of the shale base, color fixing, and fusion.

It will thus be seen that, by this process, roofing granules may be produced which have a proper degree of hardness, which are evenly colored, which have a weather-resisting surface, and which will properly adhere to the asphalt of which the roofing is composed.

Owing to the fact that the pores of the granule stock have become filled with the fused borax or other flux, the granules produced will be correspondingly harder than otherwise.

It will be understood that the proportions used in the frit may be changed as found advisable and that an entirely different formula for the frit may be used, provided the temperature of the second kiln zone is never such as will completely fuse the frit during the passage of the granules through said zone.

In making the frit, the materials of which it is composed are melted together and, while in a molten state, the mass is permitted to flow into a body of water where it hardens and breaks up into comparatively small particles, ready for the pebble mill.

What is claimed is:

1. Granular material each individual granule of which comprises a base, a surface coating on the base formed of partly fused porcelain frit, and a binder interfused with said coating and said base.

2. Granular material each individual granule of which comprises a porous mineral base, a coating of partly fused enamel frit on the base and a binder fused within the pores of the base and to said coating.

3. A method of making granular material consisting of forming granules of a desired size from porous mineral material, impregnating the same with a priming flux, applying a surfacing of said flux and a porcelain enamel frit, and firing the same at a temperature and for a time to completely fuse the flux and to partly fuse the frit.

4. A method of making granular material consisting of forming granules of a desired size from mineral material, applying a surfacing of flux and a porcelain enamel frit and firing the same at a temperature and for a time to completely fuse the flux and partly fuse the frit.

5. A method of making granular material consisting of forming granules of a desired size from porous mineral material, impregnating the same with a priming flux having a relatively low melting point, applying a surfacing of said flux and a porcelain enamel frit having a relatively high melting point, firing the granules at a temperature sufficient to cause combination of the flux and porous material but below that sufficient to melt the frit, and thereinafter continuing the firing at a temperature and for a time sufficient to partly fuse the frit.

6. A method of making granular material consisting of forming granules of a desired size from porous mineral material, impregnating the same with a water soluble priming flux having a relatively low melting point, applying a surfacing of said flux and a porcelain enamel frit having a relatively high melting point, firing the granules at a temperature sufficient to cause combination of the flux and porous material but below that sufficient to melt the frit, and thereinafter continuing the firing at a temperature sufficient to partly fuse the frit.

7. Granular material each individual granule of which comprises a porous base of silicious mineral, a surface coating interfused with the surface of the base and extending into the pores thereof, a partly fused porcelain enamel frit held in said coating and projecting therefrom, and a coloring agent in said coating and the fused portion of the frit.

8. A roofing material comprising a base the surface of which is mineralized with granules as set forth in claim 1.

9. A roofing material comprising a base the surface of which is mineralized with granules as set forth in claim 7.

ERNEST H. NICHOLS.